United States Patent [19]

Quinn et al.

[11] Patent Number: 4,950,839
[45] Date of Patent: Aug. 21, 1990

[54] ELECTRICAL CORD TRANSITION ASSEMBLY FOR THE JUNCTURE OF A WORK SURFACE AND AN UPRIGHT WALL PANEL

[75] Inventors: Gail M. Quinn, Ada; Allen L. Palmbos, Jenison; Brian J. Persing, Grand Rapids, all of Mich.

[73] Assignee: Westinghouse Electric Corp., Pittsburgh, Pa.

[21] Appl. No.: 313,551

[22] Filed: Feb. 22, 1989

[51] Int. Cl.$^5$ ............................................. H02G 3/22
[52] U.S. Cl. ...................................... 174/48; 312/223
[58] Field of Search ............... 174/48, 65 R; 312/223, 312/194–197; 108/23, 50

[56] References Cited

U.S. PATENT DOCUMENTS

| | | |
|---|---|---|
| 3,762,116 | 10/1973 | Anderson et al. ............... 52/239 |
| 3,783,175 | 1/1974 | Timmons ........................... 174/48 |
| 3,787,605 | 1/1974 | Van Gessel ....................... 174/48 |
| 3,873,758 | 3/1975 | Van Gessel ....................... 174/48 |
| 3,924,829 | 12/1975 | Boundy ............................. 248/243 |
| 3,956,573 | 5/1976 | Myers ............................... 174/48 |
| 3,966,158 | 6/1976 | Boundy ............................. 248/243 |
| 4,053,701 | 10/1977 | Ogilvie ............................. 174/48 |
| 4,163,867 | 8/1979 | Breidenbach .................... 174/48 |
| 4,278,834 | 7/1981 | Boundy ............................. 174/48 |
| 4,535,703 | 8/1985 | Henriott et al. ................. 312/223 X |
| 4,603,229 | 7/1986 | Menchetti ......................... 174/48 |

Primary Examiner—Leo P. Picard
Assistant Examiner—David Tone
Attorney, Agent, or Firm—D. R. Lackey

[57] ABSTRACT

A desk having a desk top defining a work surface, an adjoining upright wall panel along at least one edge of the desk top, and an electrical cord transition assembly for a slot in the at least one edge of the desk top, at the juncture between the desk top and wall panel. The transition assembly includes a grommet which snugly lines the slot, and a grommet cover which is pivotally attached to the slot via a substantially vertically oriented pivot axis. The grommet cover may be easily assembled with the grommet, even when the grommet is individually preassembled with the slot, but difficult to remove without removing the assembly from the slot. Cooperative elements of the grommet and grommet cover form a tactile detent when the grommet cover is in a position which closes the grommet and associated slot.

10 Claims, 3 Drawing Sheets

ELECTRICAL CORD TRANSITION ASSEMBLY FOR THE JUNCTURE OF A WORK SURFACE AND AN UPRIGHT WALL PANEL

TECHNICAL FIELD

The invention relates in general to desk tops which define a work surface adjacent to a space dividing partition or wall panel, and more specifically to an assembly for the juncture between the desk top and the wall panel for accommodating the plug of an electrical cord, to permit an electrically energizable device on the work surface to be connected to an electrical receptacle below the work surface.

BACKGROUND ART

Space dividing wall panel members are used extensively in modern office buildings to provide efficient, comfortable work stations U.S. Pat. No. 3,762,116 is typical of such prior art panel based open office furniture systems. The work surface of a work station is defined by a desk top, and the desk top is usually supported from a wall panel, such as via clips, as disclosed in U.S. Pat. No. 3,924,829, or cantilever support brackets, as disclosed in U.S. Pat. No. 3,966,158. Electrical raceways are disposed in baseboards of the wall panels, with electrical receptacles being disposed in spaced relation along the raceway, such as disclosed in U.S. Pat. No. 4,278,834. All of the above mentioned patents are assigned to the same assignee as the present application.

Various electrically energizable devices are usually placed on the work surfaces, such as computers, printers, calculators, lamps, and the like, and some arrangement for accommodating the cords of the devices must usually be provided when the electrical cords are to be connected to electrical receptacles located below the work surface. With soft core panels, containing a compressible material such as fiber glass, an electrical plug may be routed behind the back edge of the work surface by pushing the plug through a small gap between the work surface and panel. The compressible panel core "gives" to allow the plug to pass the edge of the work surface, and it then returns to normal. Wall panels are increasingly constructed with rigid cores, however, and thus some arrangement must be provided to accommodate the passage of electrical plugs between the work surface area and an electrical receptacle area located below the work surface.

SUMMARY OF THE INVENTION

Briefly, the present invention is an electrical cord transition assembly, also referred to as a work surface exit cap, which aesthetically conceals a slot formed in the edge of the desk top which is adjacent to a wall panel A grommet is fixed in the slot before the desk top is hung on a wall panel, and a grommet cover is snapped into assembled relation with the grommet, either before or after the desk top is suspended from a wall panel, as desired. Once assembled, the grommet cover is difficult to remove from the grommet, without first dis-assembling the desk top from the wall panel, and removing the grommet from the slot, preventing casual removal and loss of the cover The grommet cover pivots on a substantially vertically oriented pivot axis, between a first or closed position and a second or open position which exposes the slot. The slot is dimensioned large enough to receive the largest normal electrical plug that will be associated with desk mounted devices. Once a plug of a device has passed through the slot, the associated electrical cord may be moved to the left or the right, in the direction of the device, in a small elongated space usually provided along the back edge of a desk top hung from a wall panel, and the adjacent wall panel surface. The grommet cover is then pivoted back to the first position. A tactile detent is formed by co-operable elements of the grommet and grommet cover, so when the closed position is reached it is identified by the snap action with which the grommet cover reaches the fully closed position. The grommet lines the slot with a liner which has outwardly extending flanges which overlap the work surface surrounding the slot, as well as the opposing side of the desk top, to snugly hold the grommet in the desired position, and to match the edge treatment profile of the work surface. A nail or similar fastener may be used to ensure that the grommet will not slip out of the desired assembled relation with the slot.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
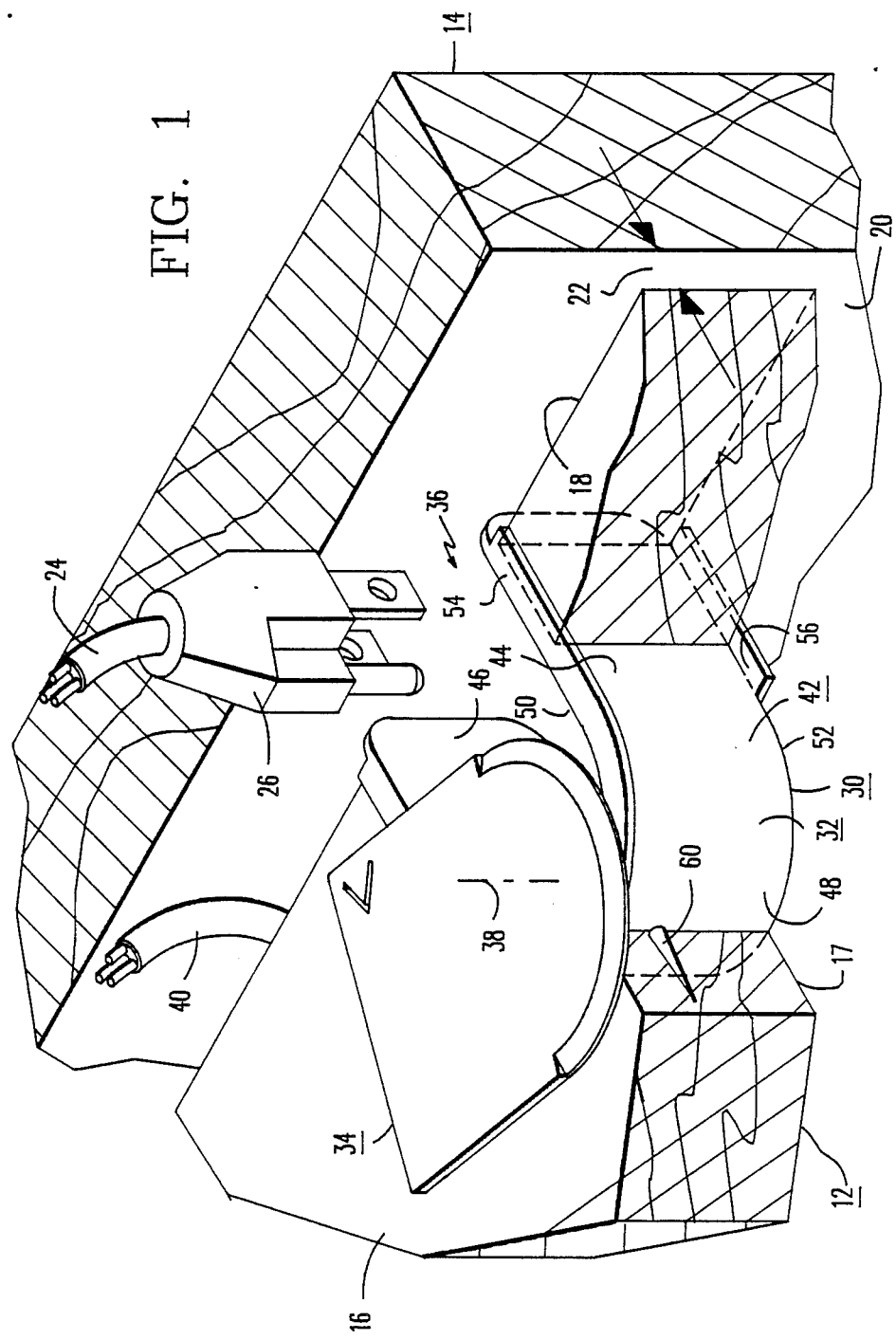
FIG. 1 is a fragmentary perspective view of a desk top, adjoining wall panel, and an electrical plug transition assembly comprising a grommet and a grommet cover constructed according to the teachings of the invention.
Figure 5:
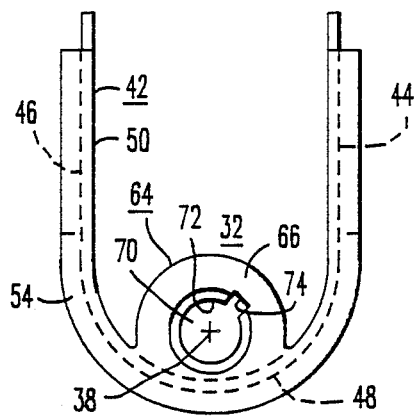
FIG. 5 is a plan view of the grommet.
Figure 4:
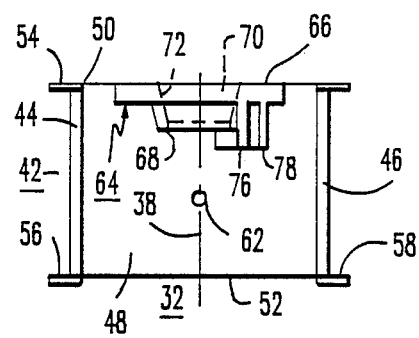
FIG. 4 is a rear elevational view of the grommet.

Referring now to the drawings, and to FIG. 1 in particular, there is shown a fragmentary perspective view, with parts cut away, of a desk 12 and an adjoining wall panel 14 from which desk top 12 may be supported. Desk top 12 includes an upper surface 16 which defines a work surface, an opposing or lower surface 17, and an edge 18 which faces an adjacent major upright surface 20 of wall panel 14. In the usual support arrangements for desk top 12, whether the support is in the form of clips or cantilevered support arms, a small elongated space 22 is usually provided between edge 18 of desk top 12 and the adjoining surface 20 of wall panel 14. Space 22 is wide enough to accommodate an electrical cord 24, but too small to receive a three-wire electrical plug 26.

FIG. 1 further illustrates a perspective view of an electrical cord transition assembly 30, or work surface exit cap, which includes a grommet 32 and a grommet cover 34 constructed according to the teachings of the invention. A U-shaped slot 36 is formed in edge 18 of desk top 12 and grommet 30 is sized to snugly fit slot or opening 36. Grommet cover 34 is pivotally attached to grommet 32, pivoting about a substantially vertically oriented pivot axis 38 between a first or a closed position which closes slot 36, to a temporary second or open position, illustrated in FIG. 1, which exposes slot 36 and allows an electrical plug 26 to be inserted through the opening. After plug 26 is below the lower surface 17 of desk top 12, cord 24 may be moved along space 22 to the right or to the left, in the direction of the associated electrically operated device, such as to a position illustrated by electrical cord 40. Thus, the only length of electrical cord required on work surface 16 of desk top 12 is that which runs directly from the associated device to the space 22 at edge 18.

Figure 2:
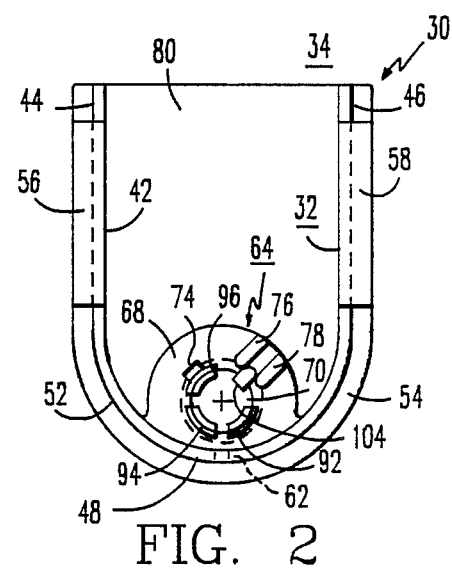
FIG. 2 is a bottom view of the transition assembly shown in FIG. 1, except with the grommet cover in a closed position.
Figure 7:
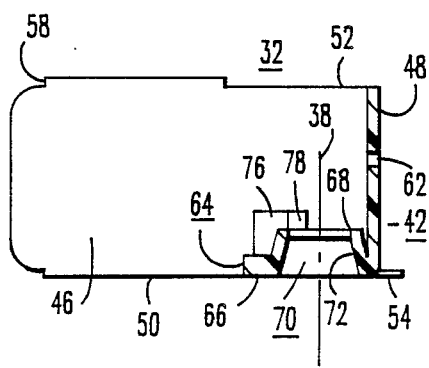
FIG. 7 is a cross sectional view of the grommet, taken between and in the direction of arrows VII—VII in FIG. 3.
Figure 3:
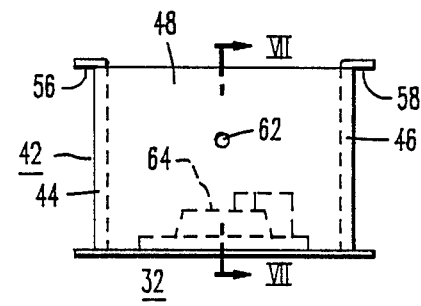
FIG. 3 is a front elevational view of the grommet shown in FIGS. 1 and 2.
Figure 9:
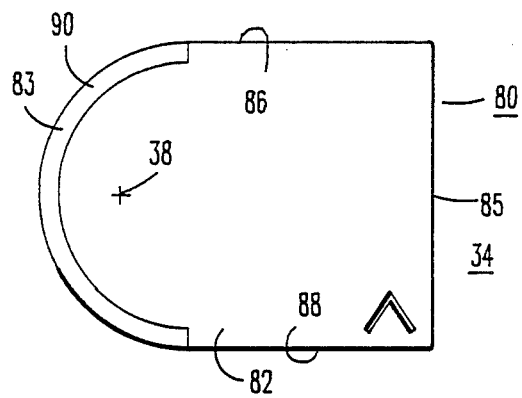
FIG. 9 is a plan view of the grommet cover.
Figure 8:
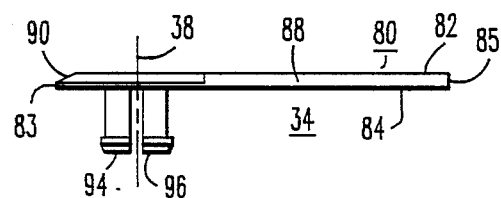
FIG. 8 is a side elevational view of the grommet cover shown in FIGS. 1 and 2.
Figure 10:
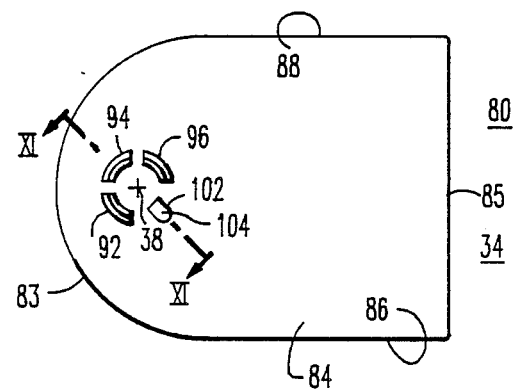
FIG. 10 is a bottom view of the grommet cover.

Grommet cover 34 is easily assembled with grommet 32, but after assembly, it cannot be easily removed, thus ensuring that it will not be removed and misplaced. Preferred embodiments of the grommet 32 and grommet cover 34 are set forth in the remaining Figures, with FIG. 2 being a bottom view of the assembly 30, FIGS. 3 through 7 being various views of grommet 32, and FIGS. 8 through 11 being various views of grommet cover 34.

More specifically, grommet 32, which is preferably constructed of a high strength plastic, such as a polycarbonate, includes a U-shaped wall portion 42 having leg portions 44 and 46 and a bight 48. Wall portion 42 has upper and lower edges 50 and 52, and an upper flange 54 which preferably extends outwardly from the upper edge 50 for the complete length of edge 50. Wall portion 42 includes lower flanges 56 and 58 which extend outwardly from leg portions 44 and 46, respectively. The vertical dimension between the upper flange 54 and the lower flanges 56 and 58 is selected to be just slightly greater than the thickness of the desk top 12 it will be associated with, for a snug but smooth sliding fit. Grommet 32 is slipped into position surrounding or lining the wall of slot 36 before desk top 12 is suspended from wall panel 14. A nail 60 disposed through an opening 62 in bight 48 may be used to secure grommet 32 in slot 36.

Grommet 32 includes a tubular hub portion 64 within the U-shaped configuration of the wall 42, with hub portion 64 being an integral extension of bight 48. Tubular hub portion 64 has an upper or first end 66 which is in the same plane as the upper flange 54, a second or lower end 68, and an opening 70 which extends between ends 66 and 68. Opening 70, which is round in cross sectional configuration, has a larger diameter at the first end 66 than at the second end 68, with a smoothly converging side wall 72 joining the two different diameters. A slot 74 is formed in side wall 72, which extends from the first end 66 to the second end 68 of tubular portion 64.

Figure 6:
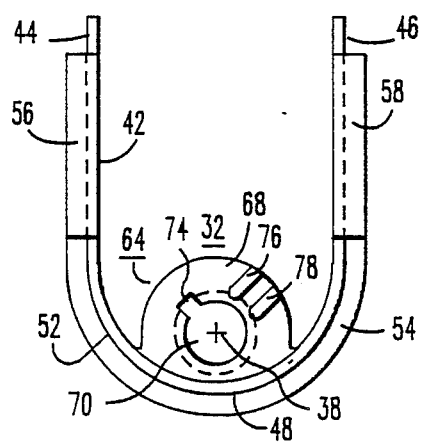
FIG. 6 is a bottom view of the grommet.

Grommet 32 is completed by first and second spaced members 76 and 78, as best shown in the bottom view of grommet 32 in FIG. 6, which members are part of the tubular hub portion 64, and which extend below the second end 68. Spaced members 76 and 78 extend towards opening 70, with an orientation such that an imaginary plane disposed centrally between them and parallel with facing wall portions of members 76 and 78, would intersect the pivot axis 38.

Grommet cover 34, shown in FIGS. 8 through 11 may be formed of the same high strength plastic material as grommet 32. Grommet cover 34 includes a thin flat sheet-like member 80 having upper and lower flat major opposed surfaces 82 and 84, respectively. Member 80 has first and second ends 83 and 85, respectively, and first and second sides 86 and 88. The first end 83 has the configuration of a half circle, and the second end 85 and sides 86 and 88 are straight The curved first end 83 may be chamfered as indicated at 90 on the upper surface 82.

Figure 11:
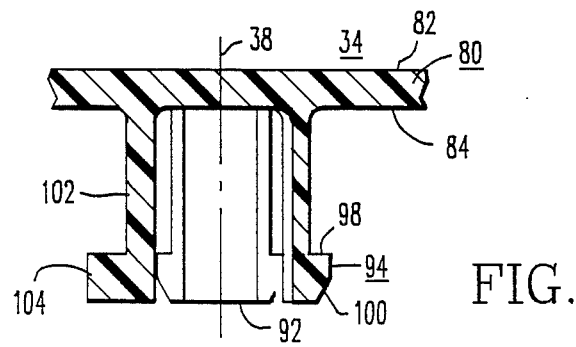
FIG. 11 is a fragmentary cross sectional view of the grommet cover, taken between and in the direction of arrows XI—XI in FIG. 10.

The lower surface 84 of cover 34 has a plurality of circumferentially spaced locking fingers depending therefrom, such as locking fingers 92, 94 and 96. As best shown in FIG. 11, which is a fragmentary cross sectional view of grommet cover 34 taken between and in the direction of arrows XI—XI in the bottom view of cover 34 in FIG. 10, each locking finger includes an outwardly extending hook adjacent its free end, such as hook 98 on locking finger 94. The dimension from lower surface 84 of cover 34 to the start of hook 98 is just slightly greater than the dimension of the tubular hub portion 64 of grommet 32, measured between the first and second ends 66 and 68 of tubular hub portion 64. The outwardly extending corners of the hook portions are chamfered, as indicated at 100 on locking finger 94 in FIG. 11.

The lower surface 84 of grommet cover 34 also includes a depending leg member 102 having an integral, outwardly extending detent shoe 104 at its free end, which feature is also best shown in the cross sectional view of FIG. 11. Leg member 102 is positioned between locking fingers 92 and 96, centered on the same imaginary circle as the locking fingers 92, 94 and 96.

To assemble grommet cover 34 with grommet 32, it is only necessary to position the grommet cover 34 over grommet 32, preferably after grommet 32 has been secured within slot 36. The locking fingers 92, 94 and 96 are placed directly over the opening 70, and cover 34 is oriented such that detent shoe 104 is directly above slot 74 in side wall 72. Forcing grommet cover 34 downwardly will cause chamfers 100 on locking fingers 92, 94 and 96 to contact side wall 72 and to resiliently bend the locking fingers inwardly towards the pivot axis 38 as the side wall converges towards the second end 68 of the tubular hub portion. Shoe 104 will slide down slot 74. When grommet cover 34 reaches its operative assembled position, hooks 98 will clear the second end 68 and snap back to their unstressed configurations in which hooks 98 will now extend outwardly over the surface of the second end 68 of hub portion 64. Thus, grommet cover 34 is captured by grommet 32, and cover 34 cannot be easily removed from grommet 32, at least not without a suitable tool that will simultaneously compress all three locking fingers 92, 94 and 96 until hooks 98 clear end 68. Then, with cover 34 oriented with detent shoe 104 aligned with slot 74, cover 34 may be removed from grommet 32 by lifting cover 34 vertically upward.

When hooks 98 clear the second or lower end 68 of tubular hub portion 64 of grommet 32, detent shoe 104 also clears end 68, enabling cover 34 to be pivoted about pivot axis 38 between a first position in which cover 34 closes slot 36, and an infinite number of temporary second positions in which cover 34 enables access to be gained to slot 36. Grommet cover 34 is dimensioned such that it may be pivoted between the first and second positions without interference with surface 20 of wall panel 14. Since there will normally be a space 22 between edge 18 of desk top 12 and surface 20, grommet cover 34 may be dimensioned such that the second end 85 is flush with edge 18 when cover 34 is in its closed first position.

Leg member 102 and shoe 104 cooperate with the spaced members 76 and 78 to form a tactile detent when the grommet cover 34 is assembled with grommet 32, which causes grommet cover 34 to snap into the first or closed position. Shoe 104 is dimensioned such that it interferes slightly with spaced members as grommet cover 34 is pivoted about pivot axis 38, thus requiring a little extra force to resiliently bias leg 102 as it passes a member 76 or 78, either towards or away from the closed first position of cover 34.

We claim:

1. In a desk having a desk top defining a work surface, and an adjoining upright wall panel at a predetermined edge of the desk top, an electrical cord transition assembly for accommodating an electrical plug of an electrically energizable object on the work surface which requires access to an electrical receptacle below the work surface, comprising:

an inwardly extending slot defined by the predetermined edge of the desk top, a grommet lining said slot, and a grommet cover pivotally attached to said grommet via a substantially vertically oriented pivot axis, whereby the grommet cover substantially covers the slot in a predetermined first position, and may be pivoted away from said first position to a temporary second position which exposes the slot for passage of an electrical plug.

2. The desk of claim 1 wherein at least a portion of the predetermined edge of the desk top is spaced from the wall panel by a dimension selected to enable a cord to be moved along the work surface after an electrical plug on the end of the cord has been inserted through the grommet lined slot.

3. The desk of claim 1 wherein the grommet cover is dimensioned such that when the grommet cover is in the closed position there is a predetermined dimension between the grommet cover and the wall panel, enabling the grommet cover to be pivoted away from the closed position without interference with the wall panel.

4. The desk of claim 1 including co-operable members on the grommet and grommet cover which define a detent which holds the grommet cover in the first position until a manually applied force applied to the grommet cover overcomes the detent.

5. The desk of claim 4 wherein the co-operable members include a depending resilient leg member on the grommet cover having an integral outwardly extending shoe, and first and second spaced members on the grommet oriented to provide a predetermined interference with said shoe as the grommet cover is pivoted and approaches the first position, said first and second spaced members holding said shoe between them when said interference is overcome as the grommet cover is pivoted to the first position.

6. The desk of claim 1 wherein the grommet cover includes a lower flat surface having a plurality of circumferentially spaced resilient locking fingers depending therefrom, each of said locking fingers having a predetermined outwardly extending hook a predetermined dimension from said lower flat surface, and wherein the grommet includes a tubular portion having upper and lower surfaces, said tubular portion defining an opening which extends between said upper and lower surfaces, said locking fingers of the grommet cover being disposed in the opening defined by said tubular member, with the outwardly extending hooks extending over a portion of the lower surface of the tubular portion, to hold the grommet cover in assembled relation with the grommet.

7. The desk of claim 6 wherein the opening defined by the tubular portion of the grommet is round, having a larger diameter at the upper surface than at the lower surface and a smoothly converging wall portion therebetween, with the diameter at the lower surface being selected to provide the locking action provided by the outwardly extending hooks on the depending locking fingers of the grommet cover.

8. The desk of claim 7 wherein the lower flat surface of the grommet cover includes a depending resilient leg member having a detent shoe extending outwardly therefrom, the lower surface of the tubular portion has two spaced members for receiving the detent shoe when the grommet cover is in the first position, and the smoothly converging wall portion includes a slot dimensioned to receive the shoe during assembly of the grommet cover with the grommet.

9. The desk of claim 1 wherein at least a portion of the predetermined edge of the desk top is spaced from the wall panel by a dimension selected to provide an elongated opening which enables an electrical cord to be moved along the work surface after an electrical plug on the end of the cord has been inserted through the grommet lined slot, and wherein the wall panel is incompressible to the extent that a three wire electrical plug cannot be inserted through said elongated opening.

10. The desk of claim 1 wherein the grommet has a wall portion which lines the slot, and including flanges on the wall portion which extend uniformly outward from edges which define the slot, on both the work surface side of the table top, and on the opposing side.

* * * * *